United States Patent [19]

Sivov

[11] Patent Number: 4,617,970

[45] Date of Patent: Oct. 21, 1986

[54] FLUIDIC SENSOR OF OBJECTS

[75] Inventor: Ferdo A. Sivov, Sofia, Bulgaria

[73] Assignee: Institute po Mebeli I Obzavejdane, Sofia, Bulgaria

[21] Appl. No.: 727,863

[22] Filed: Apr. 26, 1985

[51] Int. Cl.[4] .................. F15C 4/00; F15C 3/00
[52] U.S. Cl. .................. 137/805; 137/832; 137/842; 137/557
[58] Field of Search .............. 137/804, 805, 832, 842, 137/557

[56] References Cited

U.S. PATENT DOCUMENTS

| | | | |
|---|---|---|---|
| 1,088,817 | 3/1914 | Graham | 137/557 |
| 3,379,165 | 4/1968 | Mott | 137/804 |
| 3,563,484 | 2/1971 | Bray, Jr. | 137/805 |
| 3,623,053 | 11/1971 | Meyer | 137/804 |
| 3,706,263 | 12/1972 | Johnson | 137/805 |
| 4,372,334 | 2/1983 | Paul, Jr. | 137/557 |
| 4,484,601 | 11/1984 | Compan | 137/804 |

Primary Examiner—A. Michael Chambers

[57] ABSTRACT

A fluidic sensor of objects comprising a body in which there are mounted an emitting nozzle connected to a feeding chamber connected to a feeding conduit, and an intake nozzle disposed in the area defined by the emitting nozzle and connected to an outlet conduit. Between the inlet conduit and the feeding chamber there is, shaped in the body, an additional chamber inside which there is a movable valve body with conical seats shaped on opposite ends, which is connected to a switching sensor movably mounted in the body. The switching sensor disconnects the flow of feeding energy when the object is outside a zone of detection and causes an acoustic signal if the object moves too close to the fluidic sensor. The acoustic signal can be used to cause a breakdown step.

4 Claims, 4 Drawing Figures

FLUIDIC SENSOR OF OBJECTS

BACKGROUND OF THE INVENTION

This invention relates to a fluidic sensor of objects, which can be used in different control systems, for measuring and checking sizes and distances, etc.

A typical fluidic sensor of objects comprises a body in which there is mounted an emitting nozzle, connected to a feeding chamber, which is connected with an inlet conduit, and an intake nozzle disposed in the area defined by the emitting nozzle and connected to an outlet conduit. The inlet flow flows out of the emitting nozzle and is directed toward the object. The flow reflected from the object is received by the intake nozzle and is conducted towards the outlet conduit. The latter is unified by a converter-amplifier.

Disadvantages of this typical design include: high energy consumption because of the constant expense of feeding energy, the risk of producing a very high (absolute value) output signal when the object approaches very close to the sensor, and the resulting danger of breakdown.

SUMMARY OF THE INVENTION

It is an object of this invention to develop a fluidic sensor of objects with reduced consumption of feeding energy, which provides a limited (by absolute value) output signal and has greater reliability in operation.

This object is achieved by developing a fluidic sensor of objects which comprises a body in which there are mounted an emitting nozzle connected to a feeding chamber; the feeding chamber being connected to an inlet conduit; and an intake nozzle coaxially disposed in the area defined by the emitting nozzle and connected to an outlet conduit. According to the invention, between the inlet conduit and the feeding chamber in the body there is shaped an additional chamber having conical ends, inside which there is movably disposed a valve body with conical seats shaped on opposite ends; the value body being connected to a switching sensor movably mounted in the body. In one embodiment of the invention, the valve body is connected at opposite ends, by means of two axles, to guides mounted in guide conduits in the body. The switching sensor is rigidly connected to the front part of the valve body by means of a threaded joint to the front guides. Within the switching sensor, the axles, and the valve body, there is shaped a common longitudinal conduit which connects the inlet conduit to a conduit machined in the switching sensor. The conduit within the switching sensor is closed in the front end of the switching sensor by means of a sealing screw. In its rear end, the valve body is supported by a spring.

In a second embodiment of the invention, the valve body is shaped with longitudinal slots. It is made of material with magnetic properties and its connection to the switching sensor is indirect-magnetic. The rear end of the switching sensor is connected to a permanent magnet disposed above the valve body, in a second additional chamber which is shaped into the body, and is supported by a spring limited in its other end by a pressure screw with stop. The inlet conduit is connected to the second additional chamber via a second additional conduit.

The advantages of the invention lie in the reduced consumption of feeding energy, the possibility of limiting the magnitude of the output signal and the increased reliability and longevity of the sensor and the system converter-amplifier.

BRIEF DESCRIPTION OF THE DRAWINGS

With these and other objects in view, which will become apparent in the following detailed description, the present invention, which is shown by example only, will be clearly understood in connection with the accompanying drawings, in which.

DETAILED DESCRIPTION OF THE DRAWINGS

Figure 1:
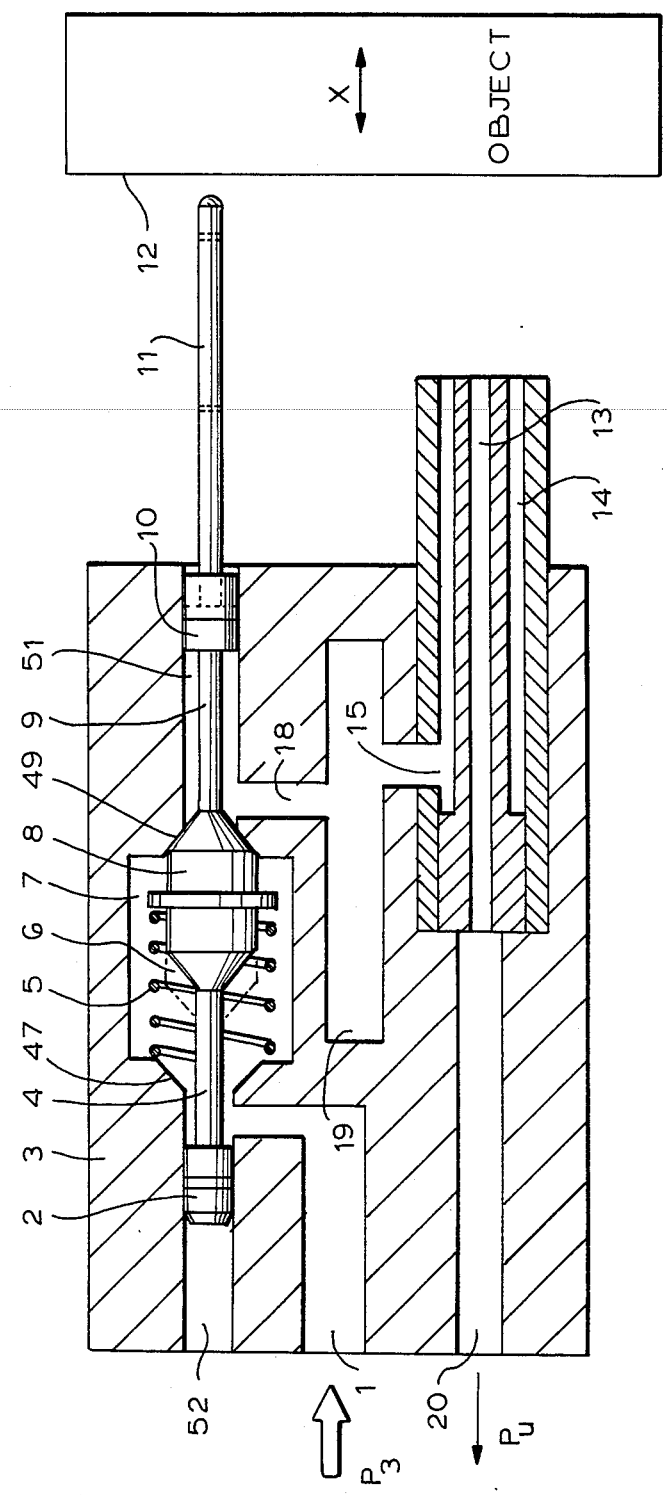
FIG. 1 is a cross-sectional view of the fluidic sensor of objects with a mechanically driven valve system.

Referring to FIG. 1, the fluidic sensor of objects comprises a body 3 in which are mounted an emitting nozzle 14, connected to a feeding chamber 19 via connecting conduit 15, and an intake nozzle 13, coaxially disposed in the area defined by the emitting nozzle 14 and connected to an outlet conduit 20, shaped in the body 3. The feeding chamber 19 is connected to inlet conduit 1 by way of an additional chamber 7 shaped in the body 3, inside which additional chamber 7 there is movably disposed valve body 8 with conical seats 48 (see FIG. 2) shaped on opposite ends. The chamber 7 is connected to the feeding chamber 19 via feeding conduit 18 near the front conical end 49 of chamber 7. Inlet conduit 1 is connected to chamber 7 near the rear conical end 47 of chamber 7. According to FIG. 1 the valve body 8 is connected at both ends, by two axles 4 and 9, to guides 2 and 10, mounted in guide conduits 51 and 52 in the body 3. To the front guide 10, a switching sensor 11 is attached by means of a threaded joint and is thereby movably mounted in the body 3. In the rear end of the valve body 8 there is provided an elastic element 6 and the valve body 8 is supported by a spring 5.

Figure 2:
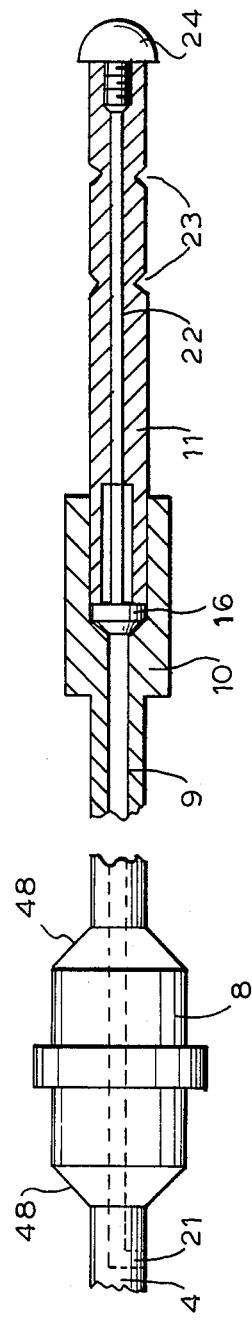
FIG. 2 is a cross-sectional view of the switching sensor and part of the valve system of the fluidic sensor.

Referring to FIG. 2, the external surface of the switching sensor 11 is provided with grooves 23. In the body of the switching sensor 11 there is shaped an escape conduit 22 closed in its front end by sealing screw 24. In the guide 10, the axle 9, the valve body 8, and the axle 4, there is shaped a common longitudinal conduit 21 which can connect the inlet conduit 1 with the escape conduit 22 of the switching sensor 11 when the value body 8 is in the rear most position. In the longitudinal conduit of the guide 10, there is mounted an acoustic whistle 16.

In another embodiment of the invention (FIG. 3), the valve body 8 is provided with longitudinal slots 38 and is made of a material with magnetic properties. The rear end of the switching sensor 11 is connected to a permanent magnet 28 disposed above the valve body 8 in a second additional chamber 27 shaped in the body 3 and is supported by the spring 26. At its other end, the spring 26 is limited by a pressure screw 25 with stop 17, and the inlet conduit 1 is connected to the second additional chamber 27 via a second additional conduit 29.

The emitting nozzle 14 (FIG. 1) and the sensor 11 are oriented against the object 12.

Figure 4:
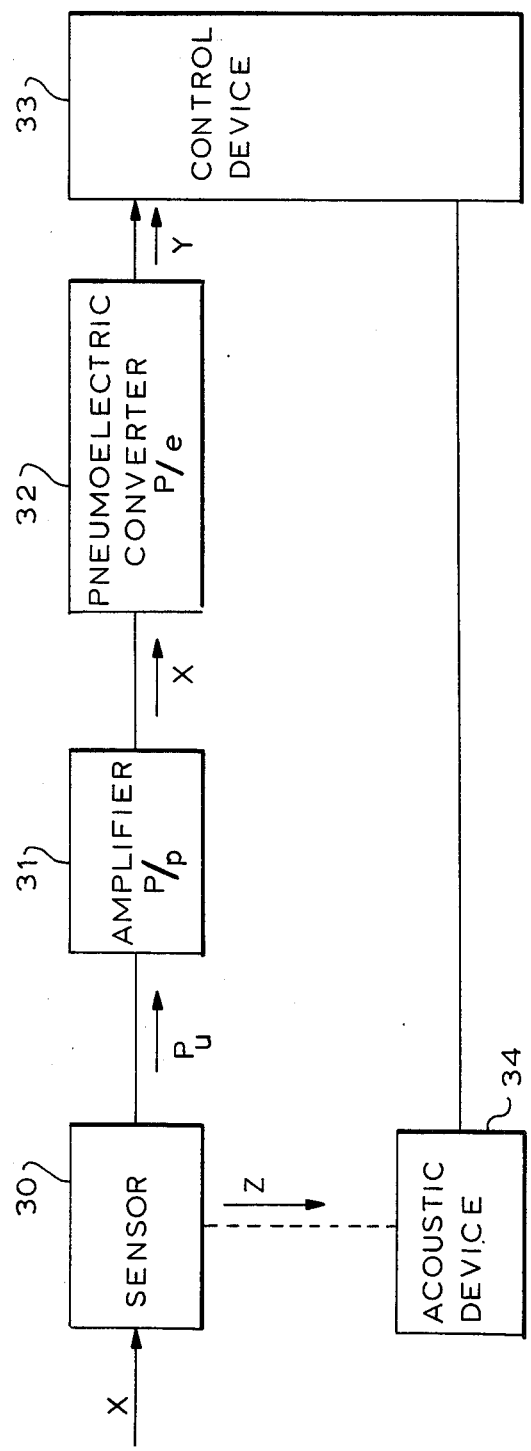
FIG. 4 is the block diagram of a control system for the fluidic sensor of objects.

In the block diagram shown in FIG. 4, the output signal of the fluidic sensor of objects 30 is fed to the amplifier 31, connected to a pneumoelectric converter 32, which is connected to a control device 33. The fluidic sensor of objects is also connected acoustically to the acoustic device 34, which is connected to the control device 33 for breakdown stop.

The operation of the fluidic sensor of objects is as follows:

When the object 12 approaches the fluidic sensor, immediately before it enters the zone of detection, the switching sensor 11 is actuated and, with that, the feeding of the emitting nozzle 14 is switched on. This is effected by displacement of the valve body 8 against spring 5 (FIG. 1). In the next moment, with a sufficient approach of the object, as a result of the well known physical effect, "reflection of a jet", a single output signal is obtained in the outlet conduit 20. When the object 12 is removed backwards, the valve body 8 closes the front conical end 49 of chamber 7 and interrupts the consumption of feeding energy. However, if after the switch over of a single output signal, the object continues to move towards the fluidic sensor, then first, the body 8 closes by means of the elastic element 6, the rear conical end 47 of chamber 7 and interrupts the admission of feeding energy, while the elastic element 6 allows a certain submergence of the valve system thus connecting longitudinal conduit 21 (FIG. 2) with the inlet conduit 1. If the object continues towards the fluidic sensor, this causes a breakage of the switching sensor 11, which is reduced by the grooves 23, and this causes the production of an acoustic signal by means of the acoustic whistle 16. Feeding to the emitting nozzle 14 is therefore effected only when the object 12 is in the zone of detection.

Figure 3:
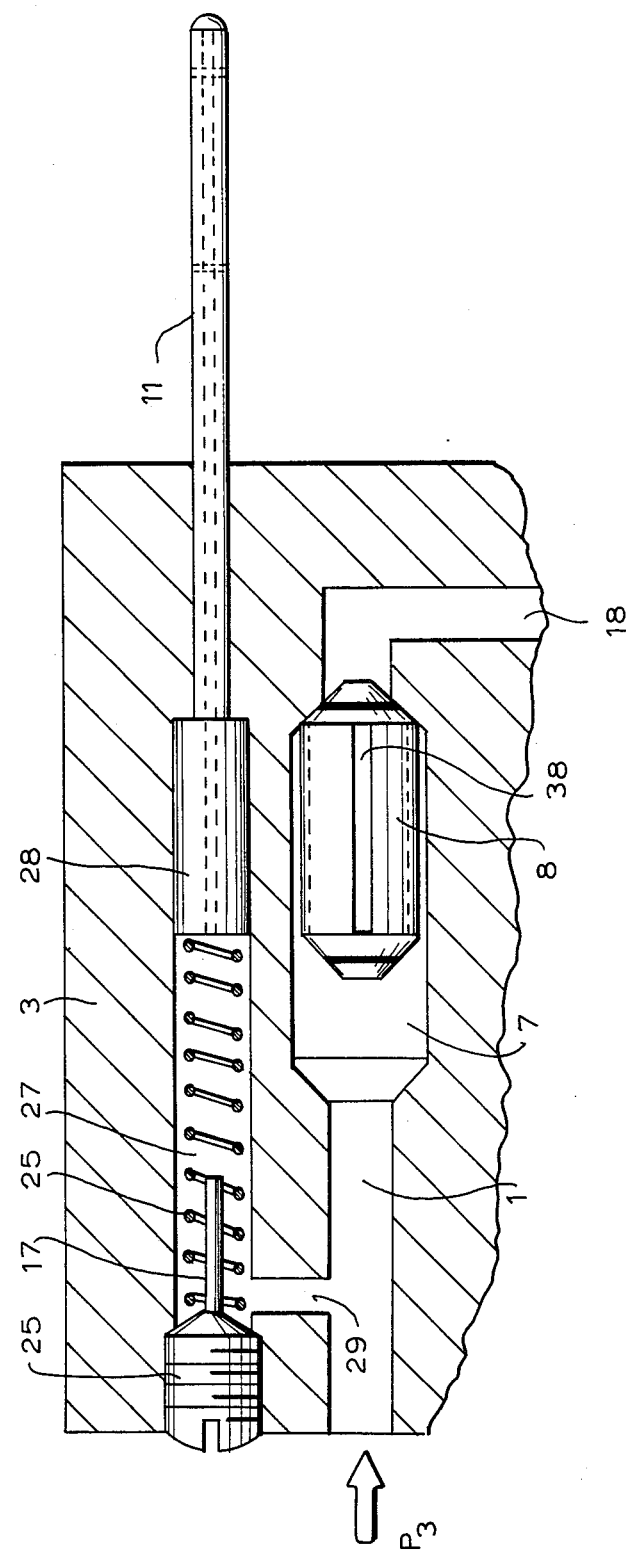
FIG. 3 is a cross-sectional view of another embodiment of the fluidic sensor with magnetic drive of the valve system.

According to FIG. 3, the object 12 causes, when entering the zone of detection, the rearward motion of the permanent magnet 28 attached to the switching sensor 11. The valve body 8, which switches on and off the supply of feeding energy, follows the motion of the permanent magnet 28. When the value body 8 is in either end position, the feeding to the emitting nozzle 14 is interrupted. In an intermediate position there is feeding and it is possible to determine the distance or the presence of the object 12. The longitudinal slots 38 in the valve body 8 serve for letting through the feeding flow.

The connection of the fluidic sensor 30 (FIG. 4) to a control device 33 is effected via an amplifier 31 and a pneumoelectrical convertor 32. In the case of breakdown, the acoustic signal Z is received by the acoustic device 34 which, by means of a direct connection with the control device 33, can cause a breakdown stop.

The suggested valve system for interrupting the feeding can also be applied in other known types of fluidic sensors (with single-sided or double-sided action).

The switching sensor 11 can be provided with different types of tips (roller, lever mechanism with or without roller, mechanism with flat spring, etc.).

I claim:

1. A fluidic sensor of objects comprising a body in which there are mounted an emitting nozzle, connected to a feeding chamber; said feeding chamber being connected to a feeding conduit; and an intake nozzle, coaxially disposed in the area defined by the emitting nozzle and connected to an outlet conduit; wherein between the inlet conduit and the feeding chamber there is, shaped in the body, an additional chamber with conical ends, inside which additional chamber there is disposed a movable valve body with conical seats shaped on opposite ends; said valve body connected to a switching sensor movably mounted in the body;

a front guide conduit and a rear guide conduit extending from the conical ends of the additional chamber;

a front guide movably disposed within said front guide conduit;

and a rear guide movably disposed within said rear guide conduit;

each of said guides being connected to said valve body by means of an axle;

said axles, guides, and valve body being provided with a common longitudinal conduit;

said switching sensor being rigidly fastened to said front guide by means of a threaded joint, and said switching sensor being provided with a similar common longitudinal conduit which is closed in its front end by a sealing screw;

said common longitudinal conduit arranged such that when said valve body is in the rear most position said common longitudinal conduit is operatively connected with said inlet conduit; the rear end of said valve body being supported by a spring.

2. A fluidic sensor of objects according to claim 1 wherein the valve body is provided with longitudinal slots and is made of a material with magnetic properties, the rear end of the switching sensor is connected to a permanent magnet disposed above the valve body in a second additional chamber shaped in the body and is supported by a spring, which is limited in its other end by a pressure screw with stop, and the inlet conduit is connected to the second additional chamber via a second additional conduit.

3. A fluidic sensor of objects according to claim 1 wherein there are machined grooves in the external surface of the switching sensor, and an acoustic whistle is mounted in the front guide.

4. A fluidic sensor of objects according to claim 1 wherein there are machined grooves in the external surface of the switching sensor, and an acoustic whistle is mounted in the front guide.

* * * * *